(12) United States Patent
Tindoll et al.

(10) Patent No.: US 7,922,640 B2
(45) Date of Patent: Apr. 12, 2011

(54) MACHINE FOR MAKING BAGS

(75) Inventors: Avalon G. Tindoll, Tupelo, MS (US);
Fred H. Page, Tupelo, MS (US); Merrill Johnston, Tupelo, MS (US); Gary Cooper, New Albany, MS (US)

(73) Assignee: Bod Packaging Equipment, Inc., Tupelo, MS (US)

( * ) Notice: Subject to any disclaimer, the term of this patent is extended or adjusted under 35 U.S.C. 154(b) by 799 days.

(21) Appl. No.: 11/516,583

(22) Filed: Sep. 7, 2006

(65) Prior Publication Data
US 2008/0076652 A1    Mar. 27, 2008

(51) Int. Cl.
*B31B 1/16* (2006.01)
(52) U.S. Cl. ......... 493/203; 493/194; 493/199; 493/204
(58) Field of Classification Search .......... 493/193, 493/194, 199, 203, 209; 53/552; 156/251, 156/515
See application file for complete search history.

(56) References Cited

U.S. PATENT DOCUMENTS

| | | | |
|---|---|---|---|
| 236,633 A | 11/1881 | Ruthenburg | |
| 360,149 A | 3/1887 | Fowler | |
| 833,470 A | 10/1906 | Lipowsky | |
| 1,053,655 A | 2/1913 | Sherrard | |
| 2,265,075 A | 12/1941 | Knuetter | |
| 2,347,439 A * | 4/1944 | Shea et al. | 493/194 |
| 2,544,044 A | 3/1951 | Reber et al. | |
| 2,789,640 A | 4/1957 | Belden | |
| 3,227,024 A | 1/1966 | Krebs | |
| 3,269,722 A | 8/1966 | Ramsey | |
| 3,384,528 A * | 5/1968 | Lehmacher et al. | 156/515 |
| 3,525,279 A | 8/1970 | Christian | |
| 3,555,974 A | 1/1971 | Davis, Jr. | |
| 3,574,039 A * | 4/1971 | Fehr et al. | 156/515 |
| 3,874,976 A * | 4/1975 | MacFarland, Jr. | 156/515 |
| 3,940,305 A * | 2/1976 | Stenberg | 493/203 |
| 4,047,711 A | 9/1977 | Gregoire et al. | |
| 4,250,796 A * | 2/1981 | Achelpohl et al. | 493/203 |
| 4,281,546 A | 8/1981 | Fraleigh | |
| 4,433,527 A * | 2/1984 | Ramsey et al. | 493/203 |
| 4,441,395 A | 4/1984 | McRoskey | |
| 4,512,138 A * | 4/1985 | Greenawalt | 53/552 |
| 4,613,320 A * | 9/1986 | Lerner | 493/198 |
| 4,630,429 A | 12/1986 | Christine | |
| 4,713,047 A * | 12/1987 | Klinkel | 493/203 |
| 4,887,973 A | 12/1989 | Susini et al. | |
| 5,094,707 A * | 3/1992 | Bruno | 156/515 |
| 5,284,002 A * | 2/1994 | Fowler et al. | 493/194 |
| 5,358,592 A * | 10/1994 | Fukuyama | 156/515 |
| 5,618,252 A * | 4/1997 | Melville | 493/194 |

* cited by examiner

*Primary Examiner* — Christopher Harmon
(74) *Attorney, Agent, or Firm* — Young & Thompson (57) ABSTRACT

A machine for making bags from sheet material of indeterminate length, especially thermoplastic material, has a pair of spaced folders of special construction for folding the material lengthwise. The entry end of the machine can be adjusted as to height. An applicator for adhesive tape can be positioned between the folders. A special construction thermowelds the folded layers together along transverse lines and severs or perforates them along those lines.

11 Claims, 9 Drawing Sheets

MACHINE FOR MAKING BAGS

FIELD OF THE INVENTION

The present invention relates to a machine for making bags, more particularly for making bags of thermoplastic material from a sheet of thermoplastic material of indefinite length, by folding the sheet to form a bottom closed edge of the bags, thermowelding the layers of the folded material together along spaced lines transverse to the length of the material and severing or perforating the material along those lines to form closed side edges of the bags, leaving the top of the bags open. Depending on whether a cutting or perforating operation is performed along the thermowelded lines, individual severed bags, or a continuous strip of bags that can easily be torn apart, will be formed.

OBJECTS OF THE INVENTION

It is an object of the present invention to provide a machine for making bags from folded sheet material of indefinite length, in which the tension in the two edges of the folded material can easily be maintained substantially equal.

Another object of the present invention is the provision a machine for making bags, in which sheet material of indefinite length can be folded with the edges of the folded material maintained in accurate relationship with each other.

Still another object of the invention is the provision of a machine for making bags, in which a tape of pressure-sensitive adhesive can be firmly applied to the open ends of the bags.

A still further object of the present invention is the provision of a machine for making bags of thermoplastic sheet material of indefinite length, in which thermowelding along lines transverse to the lengthwise extent of the sheet material and cutting or perforating along those thermowelded lines, can be performed with improved precision.

BRIEF DESCRIPTION OF THE DRAWINGS

These and other objects and advantages of the present invention will become apparent from the following description, taken in connection with the accompanying drawings, in which:

FIG. 1 is a top, end and side perspective view of a machine for making bags, according to the present invention. In FIG. 1, the movement of the material from which the bags will be made, is from right to left. The material supply, as well an optional device for receiving the completed bags, have been omitted for clarity.

DETAILED DESCRIPTION OF THE INVENTION

Figure 1:
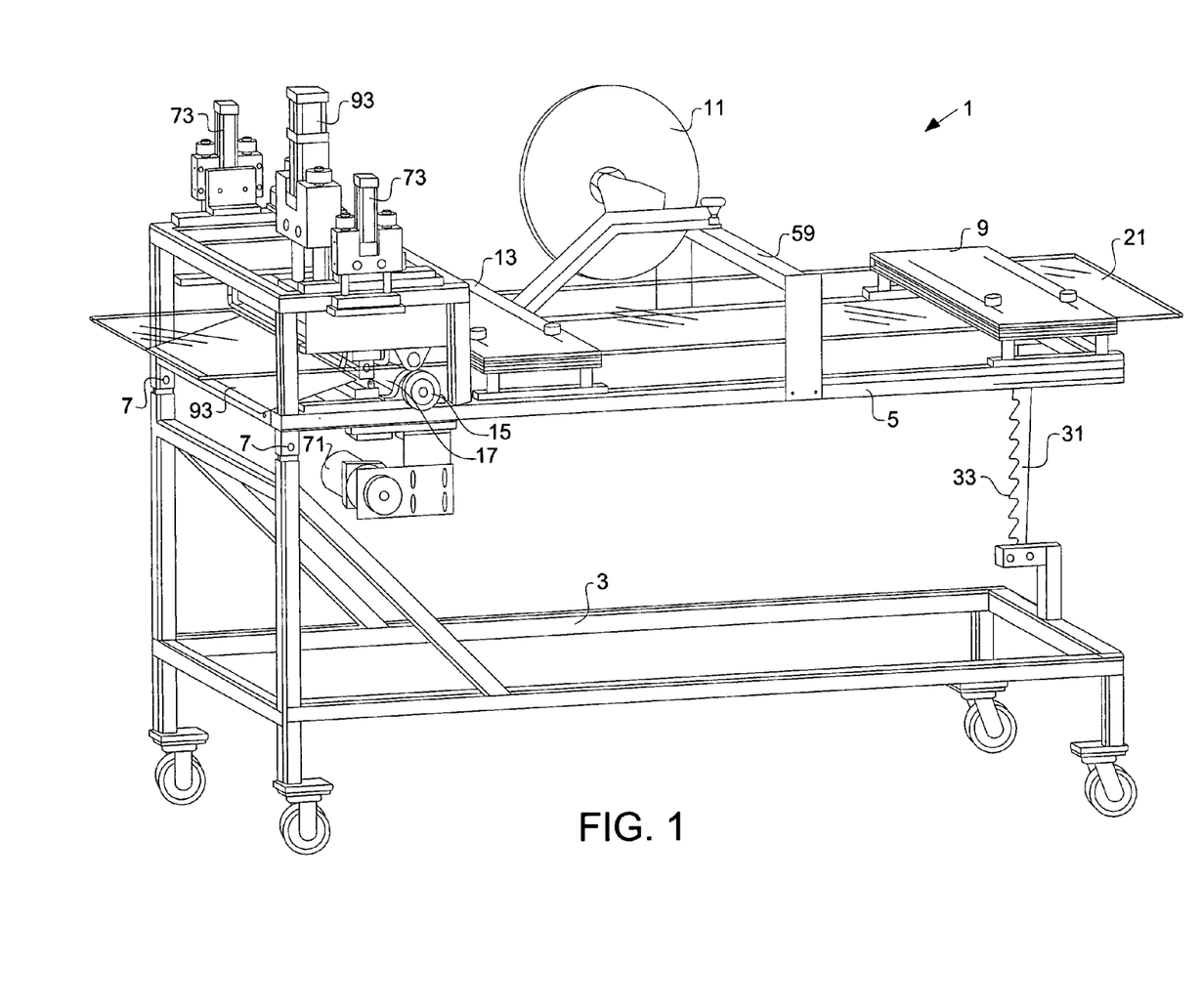

Referring now to FIG. 1 of the accompanying drawings, there will first be given a broad overview of the machine of the present invention. There is accordingly shown a machine for making bags, according to the present invention, indicated generally at 1, comprising a base frame 3, which for convenience may be portable. Frame 3 supports a vertically swinging frame 5 extending lengthwise of the machine and supported at the outlet end of the machine for vertical swinging movement about horizontal pivots 7.

Frame 5 supports a pre-folding device 9, followed (in the sense of the direction of movement of the sheet material) by an optional tape applicator of conventional nature, followed in turn by a final folding device 13.

A drive roll assembly 15 drives the material to the left as seen in FIG. 1, immediately upstream of a welding and perforating or severing assembly 17. As is well known in the art, assembly 17 can equally well perform either of two alternative functions: either it can sever separate bags, which can then be collected in any desired receptable (not shown), or else it can perforate the strip so that individual bags can be torn off one by one as needed, from an indefinite number of bags in a roll. Such a roll can be formed by the optional rewinder 19 seen in FIG. 4.

Figure 2:
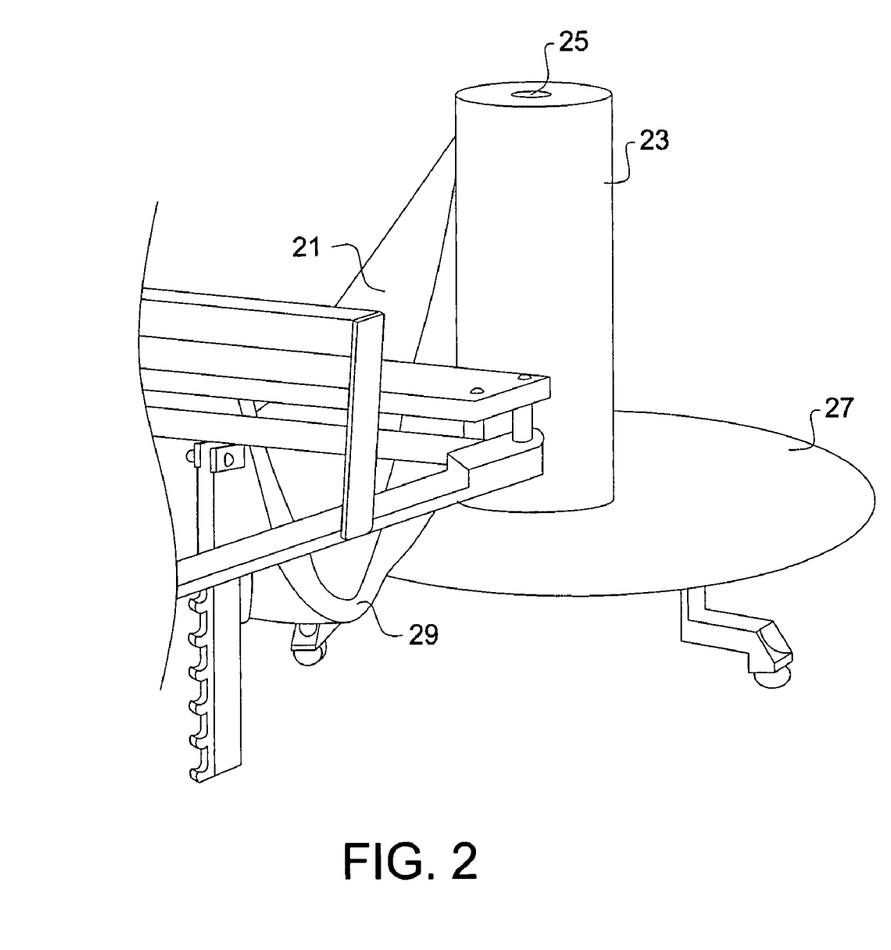
FIG. 2 is a view taken in the same general direction as FIG. 1, showing the material supply.

FIG. 2 shows the material supplied to the machine. The material to be made into bags is thermoplastic sheet material of indefinite length shown at 21. The thermoplastic material can be any used for such purposes, such as polyethylene, copolymers of ethylene and $C_3$-$C_8$ olefins, polypropylene, polyvinylidine choride, ethylene vinyl acetate, polylactic acid, etc.

This sheet material can be in a variety of forms, such as clear plastic sheet or film, or foamed plastic sheet, or else it can be the padded sheet material formed with air bubbles between two adhered sheets of plastic, e.g. BubbleWrap® (registered trademark of Sealed Air Corporation).

Such material is supplied from a roll 23 that rotates about a vertical axis on a vertical spindle 25 supported rotatably on a base 27.

Upon leaving roll 23, the material is folded in two, the folded material being shown in FIG. 2 at 29. Thereafter, the material remains folded throughout the entire operation.

Upon folding the material, at least one edge of the material becomes tensioned, because it is deflected from the vertical plane in which it leaves roll 23. It is desirable to keep the tension in both edges substantially equal; and to this end, the deflection is shared equally between the two edges of the material. To do this, the material is made to enter the machine at a level which is about mid-height of the roll 23.

But the roll 23 will vary in height according to the width of the material in question. This means that an adjustment must be made in order to accommodate rolls of different height. In the past, this adjustment has been made by making the assembly of the spindle 25 and base 27 adjustable in height, thereby to bring the midpoint of the roll into horizontal alignment with the entry end of the machine. This arrangement is shown in U.S. Pat. Nos. 236,633 and 3,269,722.

Figure 3:
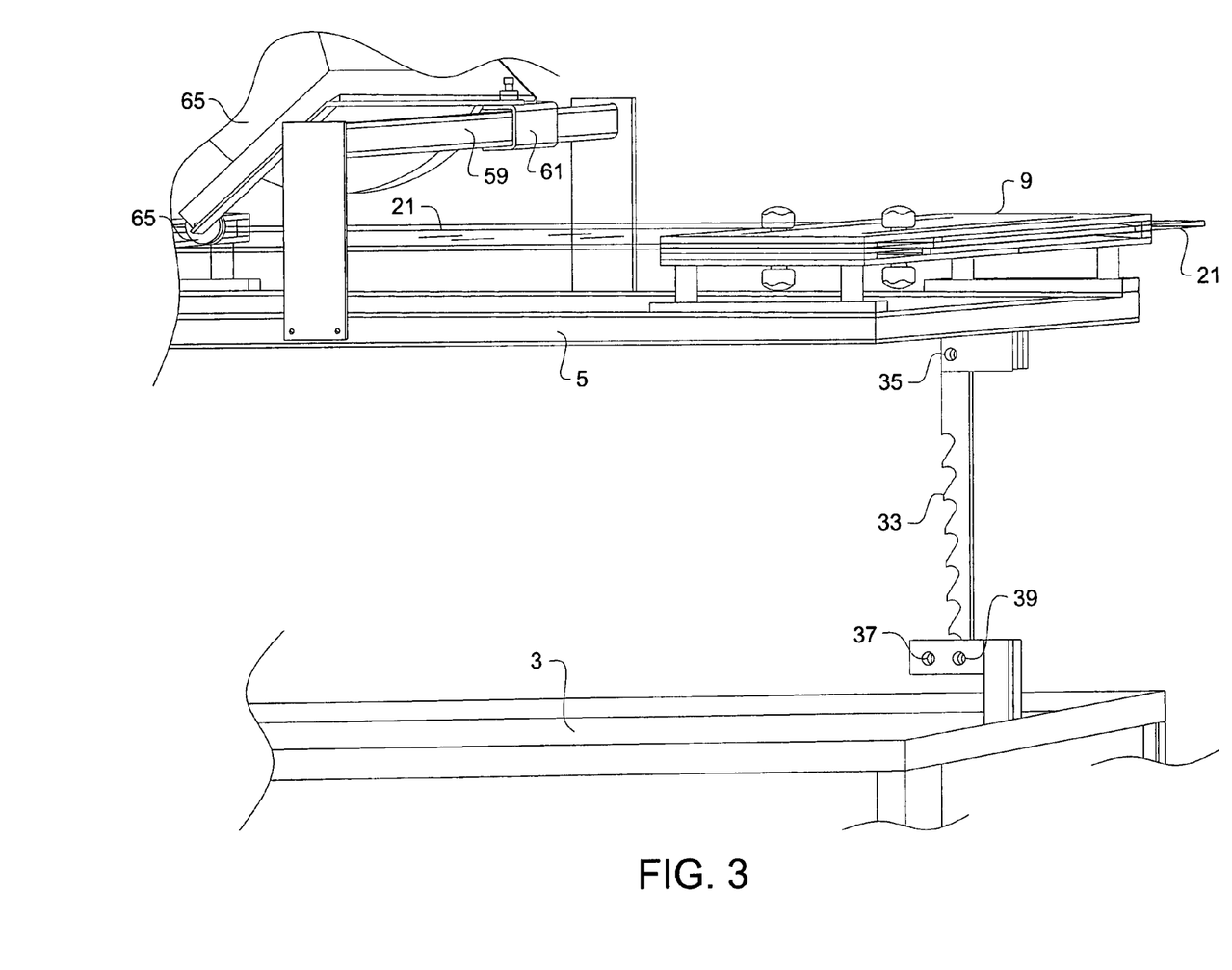
FIG. 3 is a fragmentary perspective view of the mechanism for adjusting the height of the entry end of the machine.

But according to the present invention, this adjustment to mid-height is made in a simpler manner, by making the frame 5 vertically swingable about the pivots 7. The structure for doing this is shown in FIGS. 1 and 3, from which it will be seen that a rack 31 is provided that supports the entry end of the frame 5 on the base frame 3. This rack 31 is provided with teeth 33 and is mounted for vertical swinging movement about a horizontal axis at its upper end, for which purpose bolt holes 35 are provided through frame 5 and rack 31 for the reception of a bolt (not shown).

Similarly, at the lower end of rack 31, bolt holes 37 are provided through frame 3 and rack 31, the holes 37 removably receiving a bolt (not shown) that selectively engages with one of the teeth 33 to adjust the effective height of rack 31 as desired. Once this adjustment has been made and the bolt received in holes 37 is positioned between the desired pair of teeth 33, a further bolt (not shown) is inserted through bolt holes 39 through frame 3 such that the rack cannot escape from its adjusted position.

Positioning the pivot 7 for the swinging frame 5 at the outlet end of the machine has two advantages: in the first place, it avoids any deflection of the path of the material 21 through the machine; and in the second place, by making use of the full length of the frame 5, it reduces to a minimum the angle through which the frame 5 must be swung vertically in order to come into coincidence with the middle of roll 23. The smaller this angle is, the easier it is to equalize the tension in the two edges of the strip.

Figure 4:
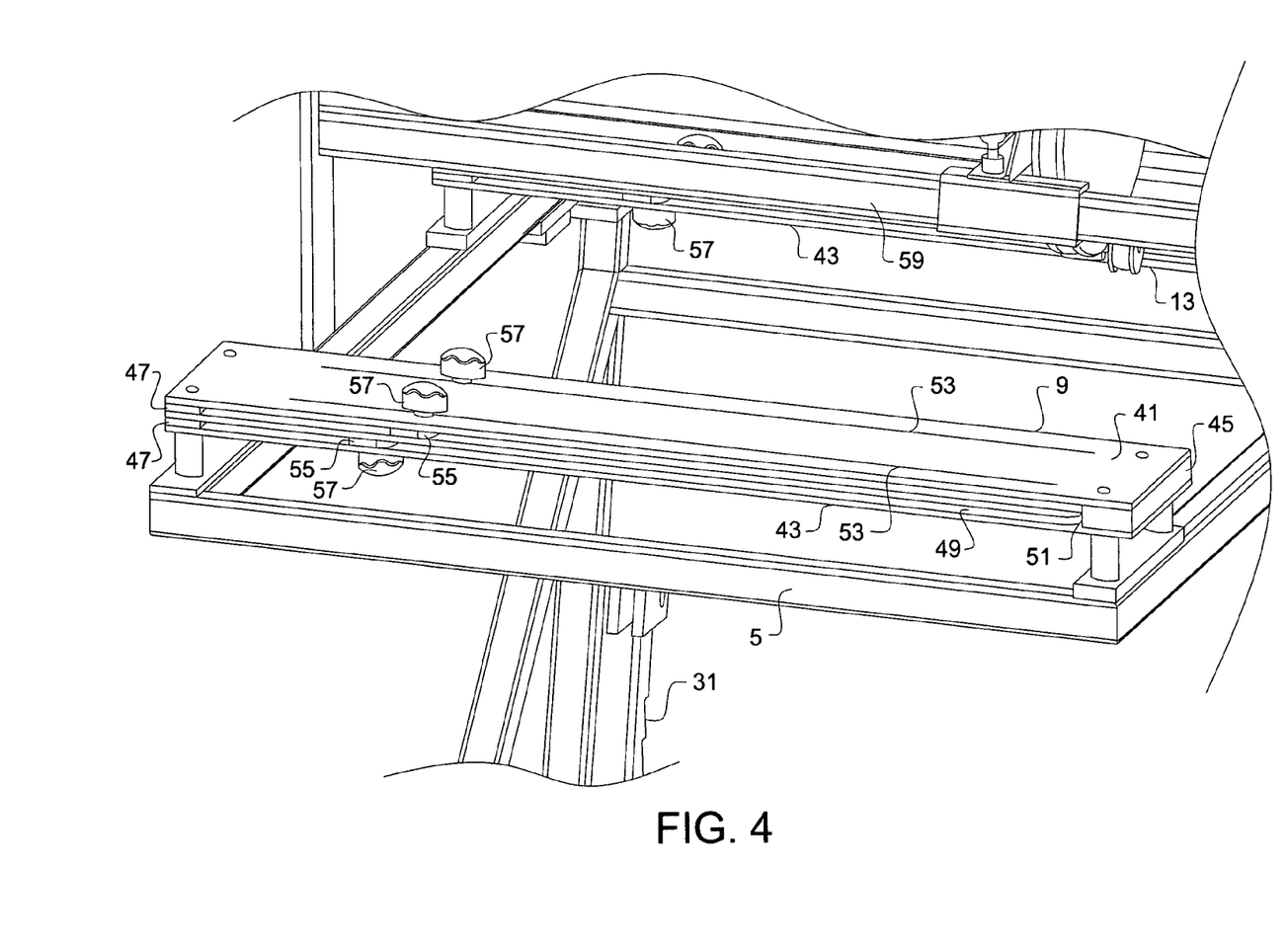
FIG. 4 is an enlarged fragmentary perspective view of the entry end of the machine.

Turning now to FIG. 4, we are looking in the direction of the material encountering the entry end of the machine. The first device encountered by the material on the machine is the prefolding device 9. The prefolding device 9 and the final folding device 13 are identical in structure, and so a description of one serves for the other.

Device 9 (or 13) comprises an upper plate 41 and a lower plate 43, parallel to each other and spaced apart at their ends adjacent the fold in the material, by a spacer 45. At their other ends, plates 41 and 43 are spaced apart by spacers 47 which grip between them an elongated horizontal tongue 49 spaced equally distant between and parallel to plates 41 and 43. Tongue 49 terminates at the right of FIG. 4 in a free end 51 about which the fold of the material 21 is formed.

At their open ends, the bags to be formed can have open end edges which coincide with each other, or one edge can protrude beyond the other. The protuberant edge can be tucked inside the other edge to close the bag, or it can be folded over the other edge to seal the bag. In this latter case, a strip of pressure-sensitive adhesive is conventionally applied to one of the open end edges, which is of course covered by a protective strip that can be peeled off immediately prior to use. Such closures are quite conventional and find a multiplicity of applications to boxes, bags and envelopes.

An important feature of the present invention, is the provision that is made for accurately locating the edges of the bags to be formed. This is done in the folding devices 9 and 13 themselves. To this end, the plates 41 and 43 of each folding device are provided with spaced parallel slots 53 extending lengthwise of the plates 41 and 43, which is to say transversely of the length of the material 21. Slidably disposed between the plates 41 and 43 and the tongue 49 are guides 55 for the edges of the material 21. Each guide 55 can be tightened against its respective plate 41 or 43 by manually rotating a handle 57 that tightens a screw attached to guide 55 and passing through slot 53. The guides 55 associated with the plate 41 will ordinarily be in alignment with each other lengthwise of the machine, as will also be guides 55 associated with the plate 43; but the position of the guides 55 associated with plate 41 can bear only the same relation to the position of the guides 55 associated with the plate 43, as the desired positions of the respective edges of the material 21 will bear to each in the finished bag. It is thus possible both very accurately to fold the sheet and very accurately to position its edges relative to each other, thanks to the novel construction of the folding devices 9 and 13.

Notice also that, as the guides 55 are in sliding contact with both the tongue 49 and their respective plates 41 or 43, the guides 55 perform a bracing and stiffening function, thereby to reduce the bending of the folding devices that would otherwise result from the folding operation.

Figure 5:
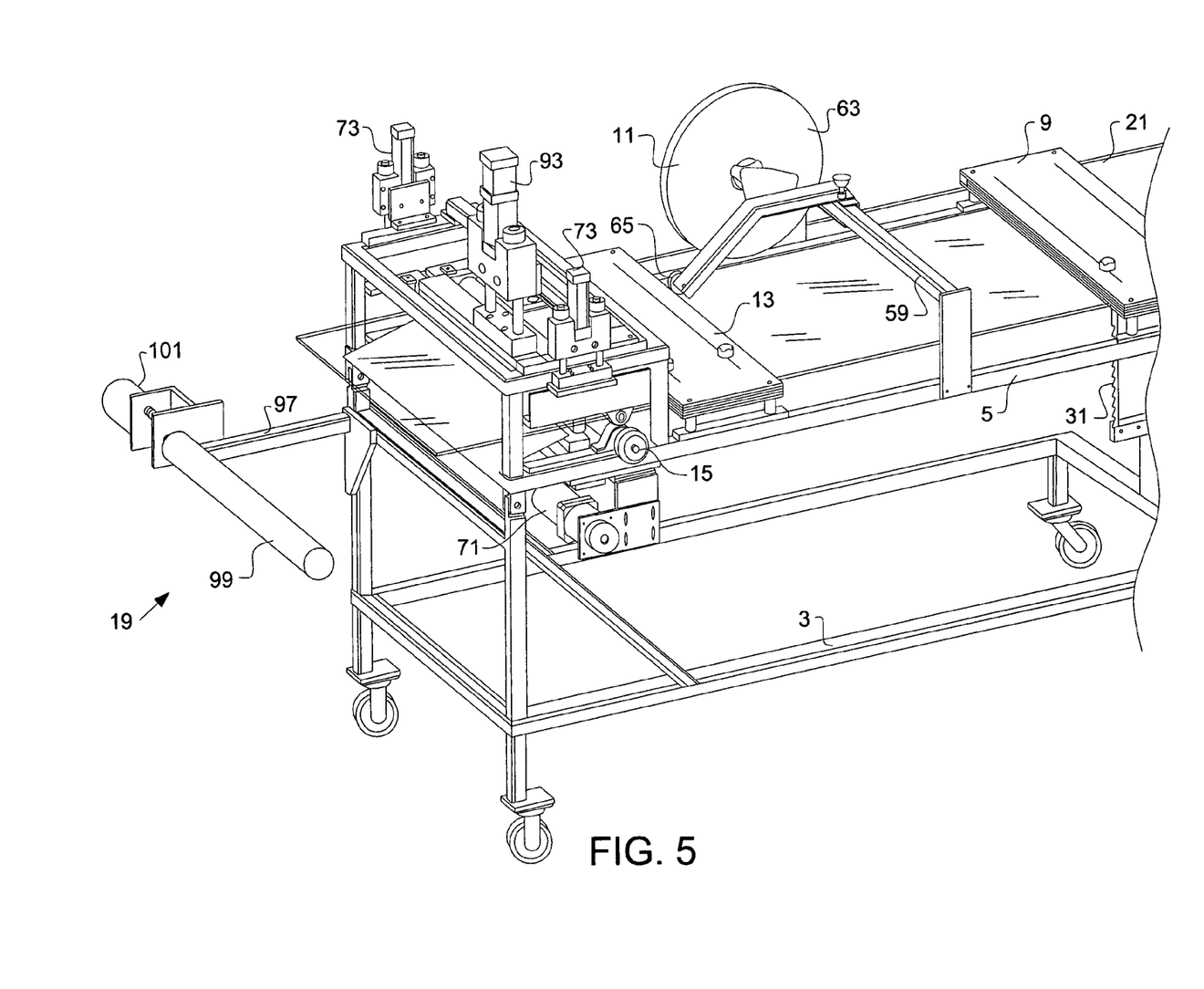
FIG. 5 is a fragmentary view similar to a portion of FIG. 1 and showing in more detail the outlet end of the machine.

Now with respect to FIG. 5, it will be seen that the tape applicator 11 is positioned intermediate the folding devices 9 and 13 with respect to the path of movement of the material 21. As previously indicated, the tape applicator is optional in the sense that it will be used only when a pressure sensitive adhesive strip, with its protective tape, is to be applied.

Thus, the tape applicator 11 is mounted for sliding movement transversely of the length of the machine, on a bridge 59 that straddles material 21. A set screw arrangement 61 selectively fixes the position of tape applicator 11 along bridge 59, depending of course on the location at which it is desired to apply tape to the bags. The tape applicator comprises a supply reel 63 from which tape (not shown) is withdrawn, the tape passing under an applicator roller 65 which presses it onto what will ultimately be the appropriate part of the bags.

The tape applicator itself is of course conventional and need not be described in greater detail. But in the environment of the present invention, it imparts to final folder 13 a unique dual function for the first time in this art.

Specifically, it has been found that the particular combination of prefolding device 9, tape applicator 11, and final folding device 13, in that order, results in a more reliably applied tape. Thus, the prefolding device 9 precisely positions the edges of the bags to receive the tape. The tape is then applied by the applicator 11, after which the final folding device 13 performs the unique dual function both of perfecting the fold and of improving the adhesion of the tape to the material 21.

But regardless of whether the tape applicator 11 is or is not present, there will be two folding devices 9 and 13. This is because it has been found that the precision of folding is improved by providing two such spaced folding devices.

Figure 6:
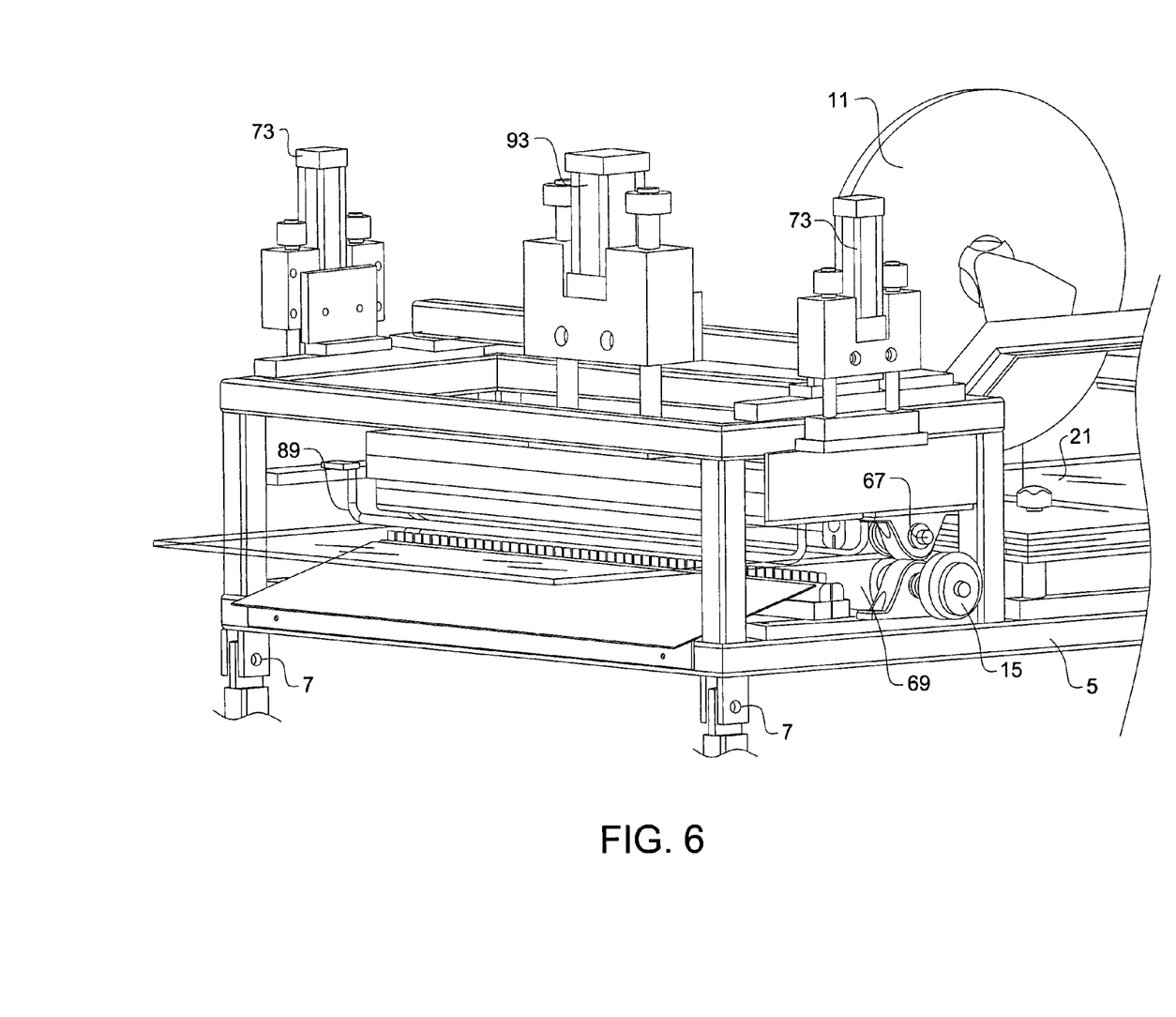
FIG. 6 is an enlarged fragmentary perspective view of the thermowelding and cutting or perforating assembly.

Turning now to FIG. 6, the drive roller assembly generally indicated at 15 is seen, comprising an upper pinch roller 67 and a lower pinch roller 69 between which the material is pulled from the supply roll 23 and drawn through the folding devices 9 and 13. In a conventional manner, the pinch roller 69 is driven by a variable speed DC motor 71 (see FIG. 1) via a drive belt (not shown). Air cylinders 73 can raise or lower the upper pinch roller 67 for threading the material. All of this is of course quite conventional.

Figure 7:
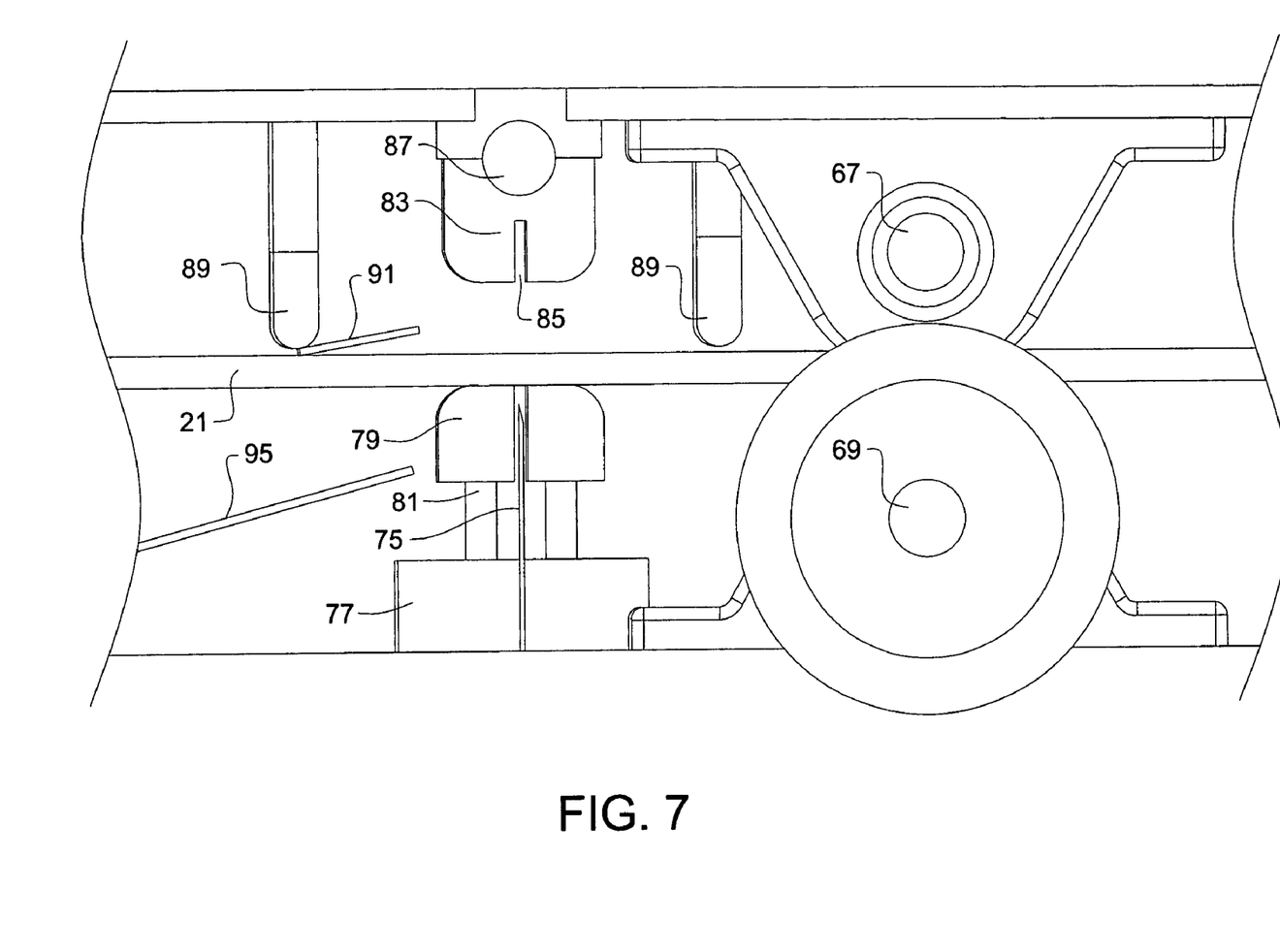
FIGS. 7-9 are enlarged fragmentary side elevational views showing successive stages in the operation of thermowelding and severing or perforating.
Figure 8:
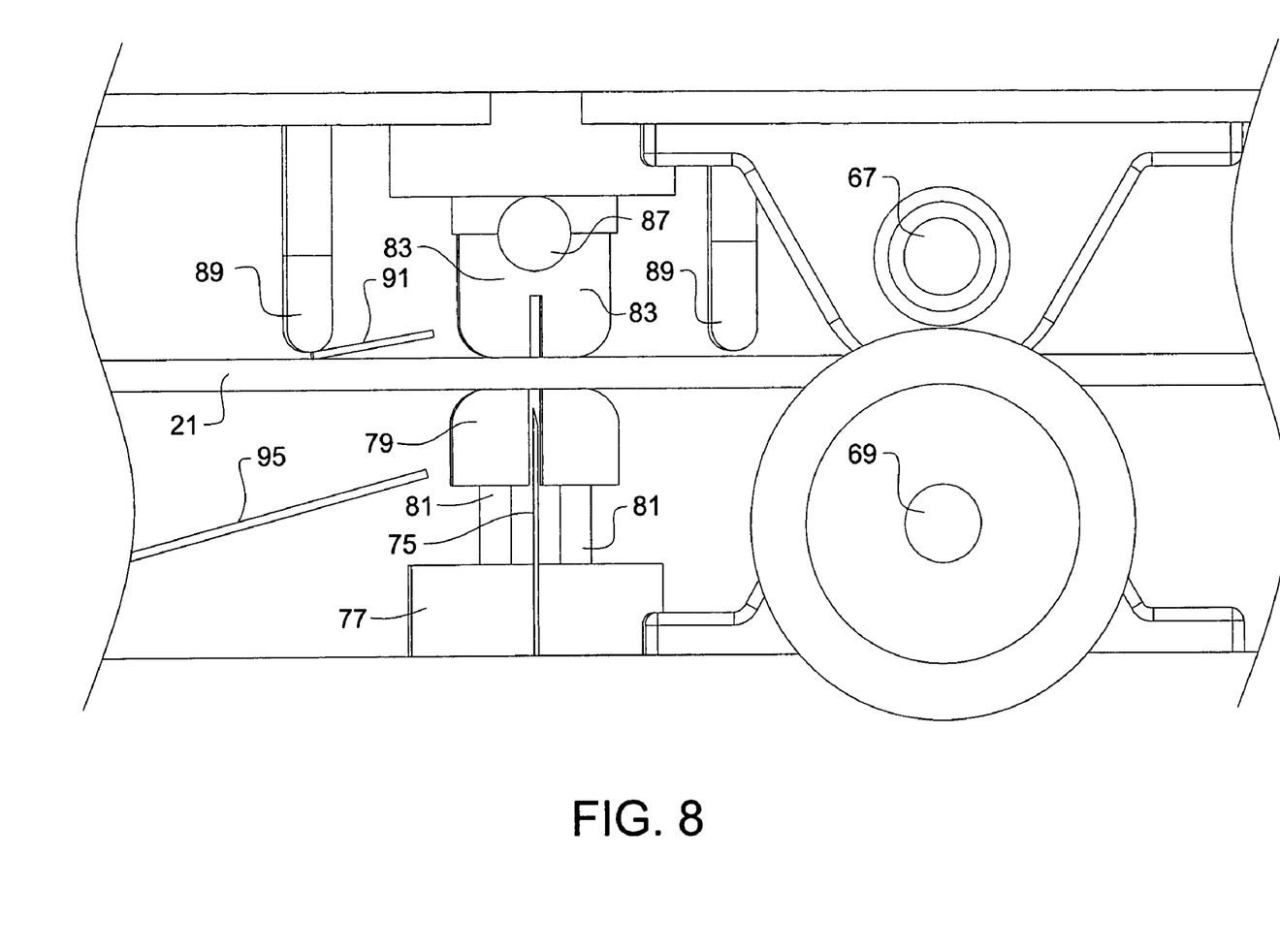
Figure 9:
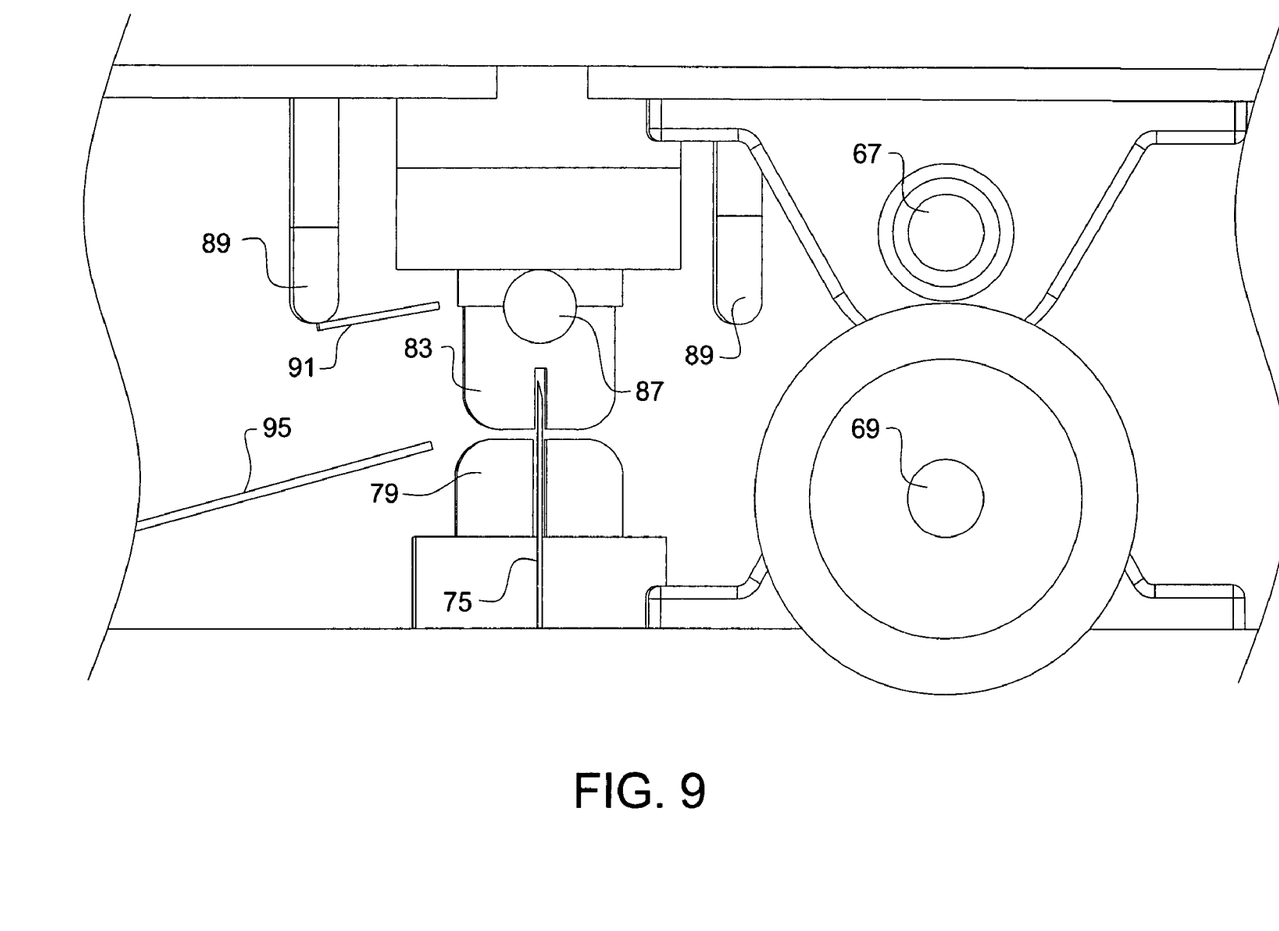

From the drive roller assembly 15, the material 21 proceeds to the welding and perforating or severing assembly 17, broadly seen in FIG. 6 but shown in greater detail in FIGS. 7-9.

As is seen in these latter figures, the assembly 17 comprises an upstanding knife 75 with a horizontal cutting or perforating edge which extends transversely of the machine, which is to say transversely of the direction of movement of the material 21. In FIG. 6, this knife is seen to be a perforating knife, whose cutting edge comprises spaced-apart segments that will perforate the material without severing it. This is useful for the production of a roll of finished bags that can be torn apart one by one for use as needed. Alternatively, however, the cutting edge of knife 75 can be continuous for the purpose of severing individual bags. Both arrangements are quite conventional in this art.

Blade 75 is held in the upright position on a mounting block 77 secured to frame 5. Knife 75 is disposed between and spaced from two halves of a bottom die 79, which halves are mounted on springs 81 so that bottom die 79 is vertically movable between the positions shown in FIGS. 7 and 8, on the one hand, and FIG. 9 on the other hand.

A top die 83 is provided, with a slot 85 extending therethrough transversely of the path of material 21 and in vertical registry with knife 75. Top die 83 is heated by a heating rod 87.

Hold-down bars 89 ensure that the material 21 will not follow die 83 to its upper position. A guide strip 91 is also found to be useful to keep the material down.

An air cylinder 93 raises and lowers top die 83.

A feed-out plate 95 is adapted to receive and slidably support individually cut-off bags if knife 75 performs a severing function.

But if knife 75 performs a perforating function, then the material 21, still in the form of a continuous strip, can be wound on the optional rewinder 19 shown in FIG. 5. This rewinder comprises a bracket 97 by which the rewinder is detachably secured to frame 3, the bracket 97 supporting a rewind spindle 99 and a variable torque compressed air motor 101 by which spindle 99 is rotated to wind up the continuous strip of formed bags.

Rewind spindle 99, when present, should always be horizontal, as the rolls of formed bags can be quite heavy, and it is difficult to wind up such a roll about any axis other than horizontal. This in turn means that, following the material backward through the machine, the material should be horizontal full length of the machine, which in turn means that the supply roll 23 has to be vertical so as to permit achieving equal tension in both edges of the strip.

If the rewinder were never used, then the machine could be oriented 90° from its present position and the supply roll 23 could be horizontal. But to adapt the machine both to the production of separate bags and to the production of a continuous roll of bags, it is convenient that the machine have its illustrated orientation.

Thus, the invention is in no way limited as to the orientation of the machine about an axis extending lengthwise of the machine.

Operation

To begin the bag making operation, a roll 23 of thermoplastic sheet material of indefinite length is placed on spindle 25 and comes to rest on base 27. The leading end of the material is then folded manually to approximately the desired condition and threaded through the prefolding device 9, below the tape applicator 11 if used, through the final folding device 13, and thence to the drive roller assembly 15. The air cylinders 73 are actuated to raise upper pinch roller 67 so that the folded leading end of the material 21 can be introduced past the rollers 67 and 69, after which the air cylinders 73 are again actuated to pinch the material 21 between rollers 67 and 69.

Before the motor 71 is actuated to move the material through the machine, the controls of motor 71 and of air cylinders 73 that actuate the top die 83 are set as desired, so that the pinch rollers 67 and 69 will deliver a predetermined length of material 21 corresponding to the desired width of the bag to be formed intermittently and in alternation with the actuation of the air cylinder 93 of top die 83.

These motor and air cylinder controls are computer coordinated so that motor 71, driving roller 69, will act intermittently and alternately with air cylinder 93, such that the rollers 65 and 67 will advance the length of material 21 equal to the desired width of the bags to be formed, and then stop for a period of time sufficient for the top die 83 to be depressed, perform its thermowelding and perforating or severing function, and then rise again.

If separate bags are to be produced, that is, if knife 75 is to perform a severing function, then nothing need be done downstream of the thermowelding and severing station other than to collect the individual formed bags. But if instead a continuous strip of bags separated by perforations is to be formed, then the thermowelding and perforating station is operated a sufficient amount of time to provide a length of a series of bags sufficient to wind about the spindle 99, after which the air motor 101 can be continuously operated. Of course the operation of the heater 87 is continuous.

The computer controls for the intermittent and alternate operation of the feed rolls and the die 83 are well known to persons having ordinary skill in this art and so need not be described in greater detail.

Referring now to FIGS. 7-9, the thermowelding and severing or perforating operation will now be described. At the outset of this operation, the motor 71 is stopped so that the feed of material 21 is discontinued, whereupon the material 21 is stationary for a time sufficient to complete thermowelding and severing or perforation. If perforation is performed and all of the completed bags are to be wound on spindle 99, the air motor 101 can continue to operate and need not be stopped, because its torque is limited and so the tension in the strip being wound on spindle 99 cannot exceed a predetermined limit, that is, it cannot tear the bags apart.

At the beginning of the thermowelding and severing or perforating operation, the parts are in the position shown in FIG. 7, with the top die 83 continuously heated and raised and the material 21 stopped. The two-piece bottom die 79 is unheated and is in its raised position, the springs 81 being extended. These springs can conventionally be coil compression springs surrounding mounting bolts and are not shown in detail for simplicity of illustration.

The heated top die 83 then descends until it contacts material 21, as seen in FIG. 8. The heat of the top die 83 causes a thermowelding operation, by which folded-over layers of material 21 are thermally bonded together along lines that extend transversely of the width of the material 21.

Continuing its downward stroke, the heated top die 83 presses with sufficient force against the thermowelded material 21 to depress the two-piece bottom die 79 against the action of the springs 81, so that the assembly moves from the FIG. 8 position to the FIG. 9 position (in FIG. 9 the material 21 is not shown, for simplicity of illustration). This causes the stationary knife blade 75 to perforate or sever the material 21, after which the air cylinder 93 raises the heated top die 83, whereupon the blade 75 retreats from slot 85 and the two-piece bottom die 79 follows upwardly because it is no longer urged downwardly, the springs 81 causing the bottom die 79 to rise.

The rising of the bottom die 79 strips the material 21 from the blade 75. Notice that the blade 75 is out of contact with bottom die 79. As a result, any heat from heated top die 83 that passes through the material 21 to the bottom die 79 is not transmitted to the blade 75. The blade 75 thus remains relatively cool, which facilitates stripping the material 21 therefrom.

Notice also that the raised bottom die 79 shields material 21 from knife 75 when material 21 is moving, as can be seen from FIG. 7.

Similarly, blade 75 never touches the sidewalls of slot 85 in heated top die 83.

The hold-down bars 89 prevent the material 21 from following the heated top die 83 upwardly, so that a clean separation of the thermowelded material 21 from the dies 79 and 83 and the knife 75, is completed.

It is known in the art of thermowelding bags in this manner, to provide a heated top die and an unheated bottom die, as shown for example in U.S. Pat. Nos. 3,555,974 and 4,630,429. It is also known, in the art of severing paper products without thermal welding, to provide a spring-urged bottom die that retreats downwardly under the pressure of a top die thereby to expose a knife which severs the paper, as in U.S. Pat. Nos. 833,470 and 3,227,024. But the present invention differs significantly from either of these techniques, and goes beyond the teaching of these references in that the heating of the top die and the thermowelding of the folded-over layers, prevents the slippage relative to the dies and the knife, that is encountered in the latter case of unheated dies severing paper material, and the slippage that occurs in the former instance of heated dies that cause severance or perforation prior to pressing against the lower die. In other words, the present invention, by combining the two techniques, solves the problem of slippage that plagued both techniques individually.

Notice also the position of pinch rollers 67 and 69 immediately adjacent assembly 17. This arrangement also contributes to avoiding slippage in assembly 17.

From a consideration of the foregoing disclosure, therefore, it will be evident that all of the initially-recited objects of the invention have been achieved.

Although the present invention has been described and illustrated in connection with a preferred embodiment, it is to be understood that modifications and variations may be resorted to without departing from the spirit and scope of the invention. Such modifications and variations are considered to be within the purview and scope of the present invention as defined by the appended claims.

We claim:

1. A machine for making bags from thermoplastic sheet material of indefinite length, having an entry end for said sheet material and an outlet end for bags, comprising, in a direction from said entry end toward said outlet end, a folder for folding said sheet material lengthwise about a fold line into two layers, and apparatus for thermowelding said layers together along lines extending transversely of the sheet material and for severing or perforating said sheet material along said lines, wherein said apparatus comprises a heated die on one side of the material, means moving the heated die toward and away from the material, an unheated die on the other side of the material and movable only by the heated die and resiliently urged toward the heated die, the unheated die being in two portions with a knife between them, the knife extending transversely of the material and being respectively shielded and exposed by the unheated die in two end positions of movement of the unheated die, the heated die being movable toward and away from the material first to press the material against the unheated die when the unheated die shields the knife and then to move the material and the unheated die together until the unheated die exposes the knife and the knife severs or perforates the material, wherein the machine applies heat to the material only from the side of the material opposite the knife.

2. A machine for making bags as claimed in claim 1, wherein said two portions of said unheated die are spaced from said knife.

3. A machine for making bags as claimed in claim 1, wherein said heated die has a slot that receives the knife after the knife has severed or perforated the material.

4. A machine for making bags as claimed in claim 3, wherein the slot has sidewalls that are spaced from the knife when the knife is in the slot.

5. A machine for making bags as claimed in claim 1, further comprising springs by which the two portions of the unheated die are urged toward the heated die.

6. A machine for making bags as claimed in claim 1, further comprising structure on both sides of the heated die adapted to contact the material when the heated die moves away from the unheated die thereby to prevent the material from following the heated die.

7. A machine for making bags as claimed in claim 1, further comprising power-driven pinch rolls immediately adjacent said apparatus on the entry side of said apparatus, the operation of said pinch rolls and said apparatus being alternate, whereby the pinch rolls hold the material stationary during operation of said apparatus.

8. A machine for making bags as claimed in claim 1, whereby the knife has a continuous cutting edge to sever the material.

9. A machine for making bags as claimed in claim 1, wherein the knife has a discontinuous cutting edge to perforate the material.

10. A machine for making bags as claimed in claim 1, further comprising means maintaining the material in contact with the unheated die prior to movement of the heated die toward the material.

11. A machine for making bags as claimed in claim 1, further comprising means holding the knife in a fixed position when the heated die advances toward and then causes movement of the unheated die.

* * * * *